United States Patent [19]

Hepworth et al.

[11] 4,284,953

[45] Aug. 18, 1981

[54] CHARACTER FRAMING CIRCUIT

[75] Inventors: Edward C. Hepworth, Austin, Tex.; Rodney J. Means, Tempe, Ariz.

[73] Assignee: Motorola, Inc., Schaumburg, Ill.

[21] Appl. No.: 48,193

[22] Filed: Jun. 13, 1979

Related U.S. Application Data

[63] Continuation-in-part of Ser. No. 863,643, Dec. 23, 1977, abandoned, which is a continuation of Ser. No. 640,981, Dec. 15, 1975, abandoned.

[51] Int. Cl.³ ..................... H03K 19/28; H03K 15/00
[52] U.S. Cl. ................................. 328/37; 307/221 R; 364/900
[58] Field of Search ..................... 328/37, 43, 48, 62; 307/221 R, 225 R; 364/900 MS File; 340/347 DD; 235/92 SH

[56] References Cited

U.S. PATENT DOCUMENTS

| | | | |
|---|---|---|---|
| 3,051,940 | 8/1962 | Fleckenstein | 328/37 X |
| 3,251,031 | 5/1966 | Bolton et al. | 328/43 X |
| 3,543,243 | 11/1970 | Nordquist | 364/900 |
| 3,575,215 | 4/1971 | Boddy | 328/37 X |

*Primary Examiner*—John Zazworsky
*Attorney, Agent, or Firm*—Vincent B. Ingrassia

[57] ABSTRACT

A digital logic circuit provides character framing for a continuous stream of synchronous serial data characters. The digital logic circuit includes a shift register arranged for serial loading and parallel unloading of the received serial data characters. The parallel unloading of a received character triggers control logic to force a control code prefix consisting of a series of logical "1"s with a trailing logical "0" into the individual shift register stages. Serial loading of the next serial data character results in successive shifts of the control code prefix through the shift register stages. Serial loading continues until the trailing logic "0" shifts into a "shift register full" stage and is detected by the control logic. Detection of a change of state in the "shift register full" stage causes parallel unloading of the received serial data character followed by another forcing of the control code prefix to reinitiate the parallel unloading sequence.

5 Claims, 2 Drawing Figures

CHARACTER FRAMING CIRCUIT

This is a continuation of application Ser. No. 863,643 filed Dec. 23, 1977, now abandoned, which was in turn a continuation of application Ser. No. 640,981 filed Dec. 15, 1975, now abandoned.

RELATED APPLICATIONS

This application is related to assignee's copending U.S. patent application SYNCHRONOUS SERIAL DATA ADAPTOR by Daly et al, Ser. No. 627,180 filed on Oct. 30, 1975, now U.S. Pat. No. 4,071,887.

BACKGROUND OF THE INVENTION

A wide variety of digital systems including microprocessor systems make use of serial data transmission in order to minimize the number of data channels between the digital system and a peripheral device being controlled. Examples of such systems includes process control or numeric control systems, data communication systems involving transmission and reception via a modem (modulator-demodulator) and serial peripheral memory units such as tapes, disks, or cassettes. Recent applications include flexible disk memory systems ("floppy disk") which have a relatively high speed data transfer requirement. In microprocessor systems, low cost integrated circuits have been designed which provide for synchronous serial data communications with the bidirectional data bus of the microprocessor system.

Digital systems of the type listed above normally require the interchange of long serial blocks of data. In order to achieve maximum efficiency in such serial data transmission, synchronous transfer methods are often employed. In synchronous transmission, special characters or codes are transmitted as a preamble to a data message comprising a continuous stream of data characters with no delineation indicating the end of one character and the beginning of the next. Thus, synchronous data communication systems transmit and receive message blocks consisting of an initial synchronization code followed by a continuous stream of data bits. Each data bit has equal bit widths and is transmitted at a fixed and defined frequency. When the synchronization code is detected at the beginning of the message block "character framing" is established. Character framing is defined as the process by which the beginning and end of the successive data character is located in the data bit stream. Character framing is normally accomplished at the beginning of the message block and is maintained throughout the block.

Conventional systems receive serial data characters from a data channel using a shift register and maintain character frame by means of a counter, typically a binary counter. In this type application, the binary counter counts to a maximum state and then automatically recycles or "rolls over" to reestablish its initial count state. In the synchronous data system, the counter is initialized when correct character frame is established. Each time the counter "rolls over" it causes a parallel transfer of data out of the shift register and reinitialization of the counter. Conventional synchronous data communications systems must provide an operation option which allows the reception of serial data characters whose length (including a parity bit) may be 7 bits, 8 bits, 9 bits or any other appropriate word length. Thus, the binary counter technique requires at least four counter stages with sufficient control logic to adjust and detect maximum count states which change depending upon the length of the serial data character received. These counter stages and the associated control logic increase the number of logic elements required to implement the receiver portion of a synchronous data communications system. In an integrated circuit embodiment these additional logic components result in increased circuit complexity and increased layout area on the integrated circuit chip.

SUMMARY OF THE INVENTION

Accordingly, it is an object of this invention to provide an improved digital logic circuit for receiving synchronous serial data characters which does not require the use of counters to maintain the character frame determining the beginning and end of each data word in a received serial bit stream.

It is a further object of this invention to provide a digital logic circuit which includes control logic for inserting a control code prefix including a logic "0" for maintaining character frame.

It is a further object of this invention to provide a digital logic circuit which includes control logic for detecting a logic "0" which is inserted to precede the first bit of a received serial data character thereby insuring that a properly framed data character is present and can be parallel-gated out of the receiving shift register.

It is a further object of this invention to provide an improved digital logic circuit for providing character framing of a received serial data character without the use of counters which utilizes a reduced number of logic components and thereby provides a higher density and correspondingly lower cost circuit structure in a monolithic integrated circuit embodiment.

Briefly described, the present invention is a digital logic circuit for receiving synchronous serial data characters in which character frame is maintained without the use of counters by providing control logic which inserts a control code including a logic "0" which leads the first bit of the received serial data character. Detection of the leading "0" establishes that a complete data character has been received and is ready for parallel unloading, thereby maintaining character frame.

DETAILED DESCRIPTION

Figure 1:
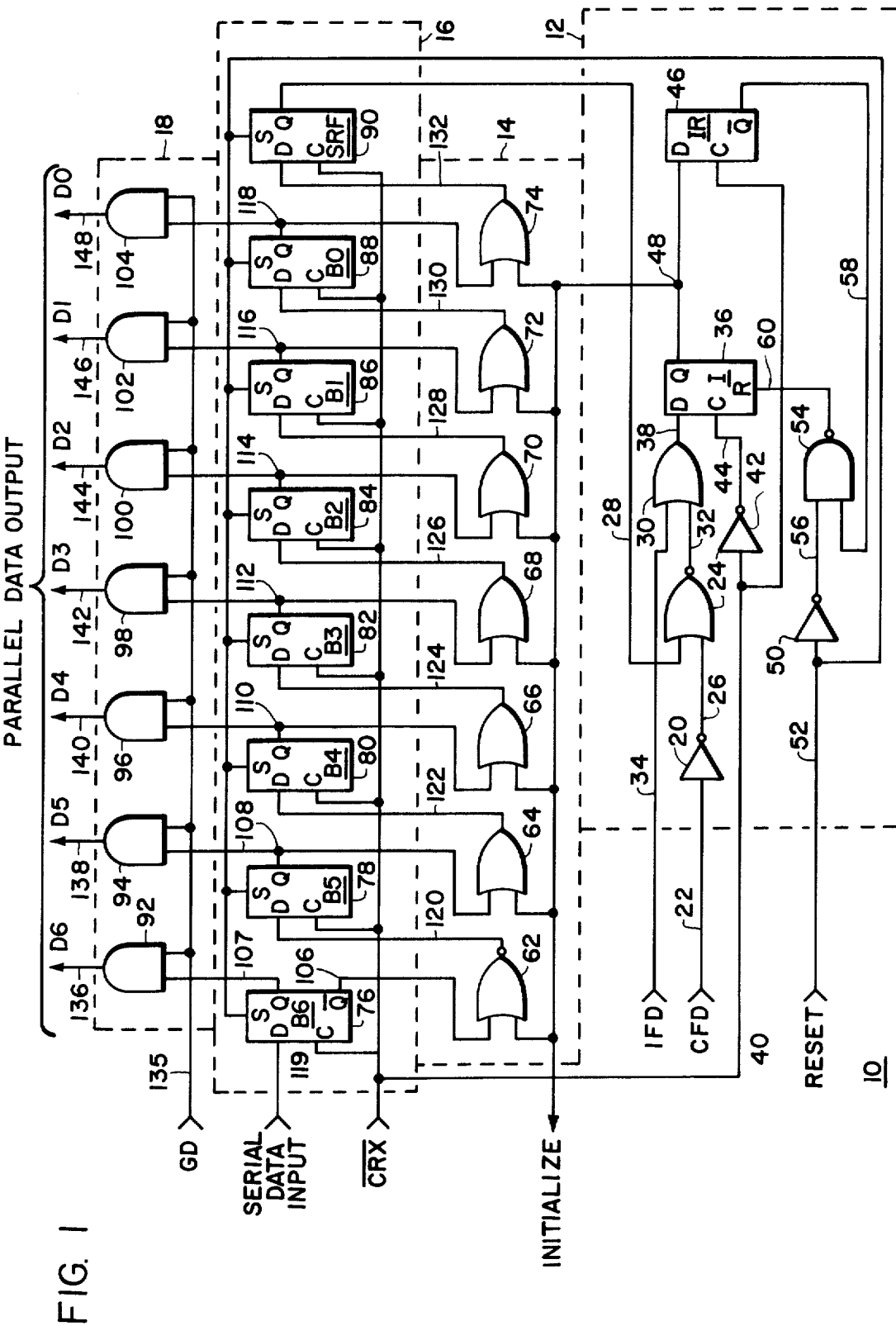
FIG. 1 shows a digital logic circuit arranged for character framing in accordance with the present invention.

FIG. 1 shows a character framing circuit 10 according to the present invention. Character framing circuit 10 comprises four major structural elements which are control logic section 12, input gating section 14, register section 16 and output gating section 18. Control logic section 12 comprises inverter 20 whose input couples to conductor 22 which is the character frame defined (CFD) input to character framing circuit 10. The output of inverter 20 couples to an input of two input NOR gate 24 via conductor 26. The other input of two input NOR gate 24 couples to register section 16 via conductor 28. The output of two input NOR gate 24 couples to a first input of two input OR gate 30 via conductor 32. A second input of two input OR gate 30 couples to conductor 34 which is the initialize on frame detect (IFD) input to control circuit 12. The output of two input OR gate 30 connects to the D (delay or data) input of initialize (I) flip-flop 36 via conductor 38. Timing signals are applied to control logic section 12 via conductor 40 which couples to the inverted receiver clock ($\overline{CRX}$) input to character framing circuit 10. Conductor 40 couples to the input of inverter 42 whose output then applies receiver clock to the clock input of initialize flip-flop 36 via conductor 44. The inverted receiver clock signal on conductor 40 also couples to the clock input of initialize reset (IR) flip-flop 46. The Q output of initialize flip-flop 36 couples to the D input of initialize reset flip-flop 46 via conductor 48 which also couples to input gating section 14. The reset input to character framing circuit 10 couples to the input of inverter 50 via conductor 52 and also couples to register section 16. The output of inverter 50 couples to an input of two input NAND gate 54 via conductor 56. The second input of two input NAND gate 54 couples to the $\overline{Q}$ output of initialized reset flip-flop 46 via conductor 58. The output of two input NAND gate 54 couples to the reset input of initialize flip-flop 36 via conductor 60.

Input gating section 14 comprises two input NOR gate 62 and two input OR gates 64, 66, 68, 70, 72 and 74. These seven two input gates all have one input coupled in common to control logic section 12 via conductor 48. The remaining inputs and outputs of the seven gates are coupled to register section 16 which comprises B6 flip-flop 76, B5 flip-flop 78, B4 flip-flop 80, B3 flip-flop 82, B2 flip-flop 84, B1 flip-flop 86, B0 flip-flop 88 and shift register full (SRF) flip-flop 90. Each of these eight flip-flops has a clock input coupled in common to the inverted receiver clock signal ($\overline{CRX}$) input to character framing circuit 10 via conductor 40. Each of these eight flip-flops also has a set input coupled in common to conductor 52 which is the RESET input to character framing circuit 10.

Output gating section 18 comprises seven two-input gates 92, 94, 96, 98, 100, 102, and 104, corresponding to the first seven flip-flops of register section 16. Thus the Q output of B6 flip-flop 76 couples to an input of two input NOR gate 62 via conductor 106 and the Q output of B6 flip-flop 76 couples to an input of two input AND gate 92 via conductor 107. The Q output of B5 flip-flop 78 couples to an input of two input OR gate 64 and to an input of two input AND gate 94 via conductor 108. The Q output of B4 flip-flop 80 couples to an input of two input OR gate 66 and to an input of two input AND gate 96 via conductor 110. The Q output of B3 flip-flop 82 couples to an input of two input OR gate 68 and to an input of two input AND gate 98 via conductor 112. The Q output of B2 flip-flop 84 couples to an input of two input OR gate 70 and to an input of two input AND gate 100 via conductor 114. The Q output of B1 flip-flop 86 couples to an input of two input OR gate 72 and to an input of two input AND gate 102 via conductor 116. The Q output of B0 flip-flop 88 couples to an input of two input OR gate 74 and an input of two input AND gate 104 via conductor 118. The Q output of shift register full flip-flop 90 couples to control logic section 12 via conductor 28.

The serial data input to character framing circuit 10 couples to the D input of B6 flip-flop 76 via conductor 119. The output of two input NOR gate 62 couples to the D input of B5 flip-flop 78 via conductor 120. The output of two input OR gate 64 couples to the D input of B4 flip-flop 80 via conductor 122. The output of two input OR gate 66 couples to the D input of B3 flip-flop 82 via conductor 124. The output of two input OR gate 68 couples to the D input of B2 flip-flop 84 via conductor 126. The output of two input OR gates 70 couples to the D input of B1 flip-flop 86 via conductor 128. The output of two input OR gate 72 couples to the D input of B0 flip-flop 88 via conductor 130. The output of two input OR gate 74 couples to the D input of SRF flip-flop 90 via conductor 132.

In section 18, an input of two input AND gates 92, 94, 96, 98, 100, 102 and 104 couple in common to conductor 135 which is the gate data (GD) input to character framing circuit 10 while the outputs of these same AND gates connect respectively to conductors 136, 138, 140, 142, 144, 146 and 148 to provide the parallel data output signals D0 through D6 from character framing circuit 10.

Figure 2:
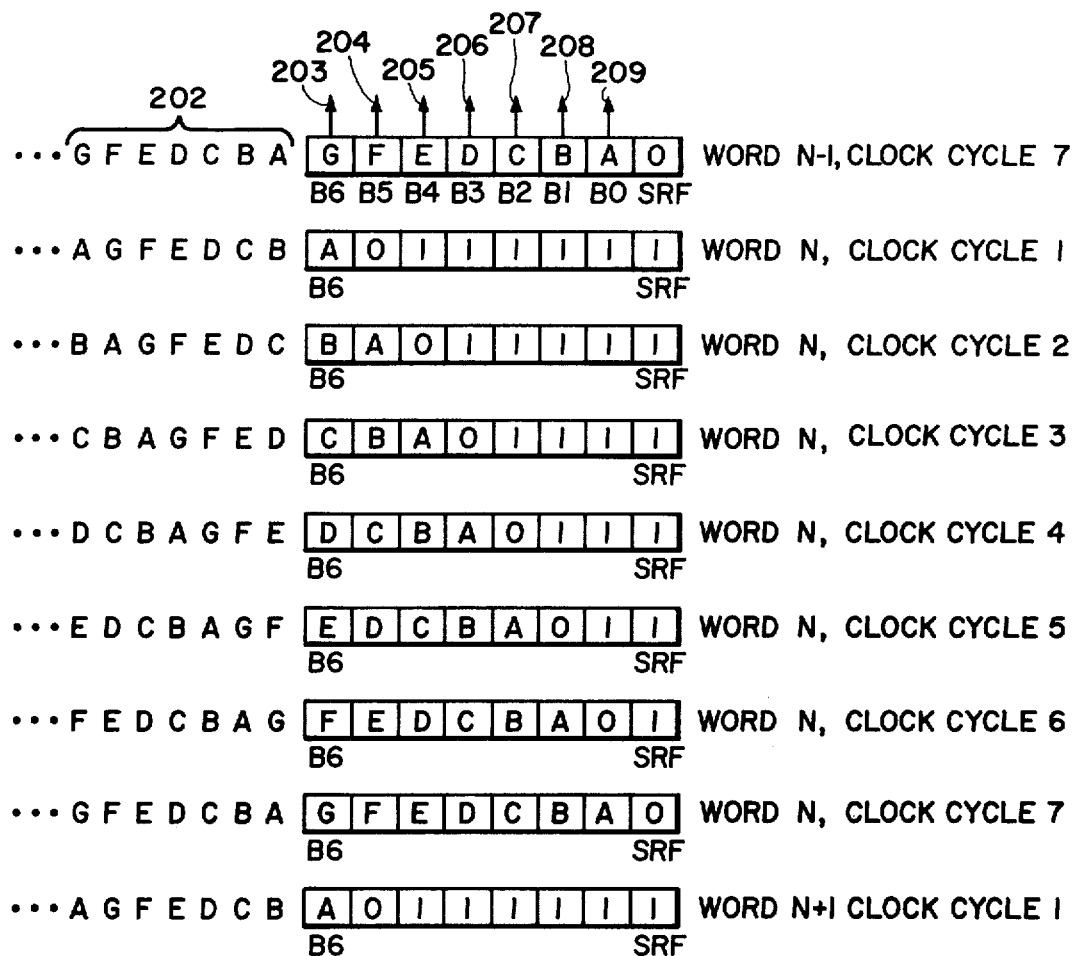
FIG. 2 shows a sequence diagram illustrative of the receiving of a synchronous serial data character and useful in explaining the invention.

The mode of operation of the present invention is explained by considering the logic operation of a particular logic embodiment shown in FIG. 1 in conjunction with the operating sequence illustrated by the diagram of FIG. 2. The basic objective of the circuit operation is to receive serial data applied at data input 119 and to shift this data through the successive register stages of shift register section 16 under control of the timing pulses applied via the $\overline{CRX}$ input 40.

An explanation of basic shift register operation is obtained by considering representative shift register stages provided by the B4 flip-flop 80 and the B3 flip-flop 82 together with OR gate 66 which is coupled between the two flip-flops. B4 flip-flop 80 and B3 flip-flop 82 are D flip-flops which means that the logical state present at the D input becomes the logical state stored in the flip-flop when the input logical state is locked into the flip-flop by a negative transition on the clock (C) input. A logic "1" level at the Q output of B4 flip-flop 80 couples to an input of OR gate 66 via conductor 110. The second input of OR gate 66 will be at logic "0" except during certain portions of a shift register initialization sequence as is explained below. Thus a logic "1" applied via conductor 110 results in a logic "1" at the output of OR gate 66 which in turn couples to the D input of B3 flip-flop 82 via conductor 124. Since the clock inputs are coupled in common to the $\overline{CRX}$ timing input via conductor 40, it follows that the logic state present in B4 flip-flop 80 will become the logic state present in B3 flip-flop 82 after a negative transition of the clock since the logic state of B4 flip-flop 80 is coupled to the D input of B3 flip-flop 82 via OR gate 66.

All of the register flip-flops of register section 16 are coupled together in a similar manner to accomplish the transfer of logic information from one successive register stage to the next under control of negative transitions on inverter receiver clock input $\overline{CRX}$. One difference in the coupling used to provide shift register action is that the $\overline{Q}$ output of B6 flip-flop 76 couples to an input of NOR gate 62 whose output then couples to the D input of B5 flip-flop 78 via conductor 120. This "double inversion" results in the transfer of the logic state contained in B6 flip-flop 76 to the D input of B5 flip-flop 78 while meeting special control logic requirements associated with initialization as will be described below.

When a complete serial data word has been shifted through the successive register stages of register section 16 such that the first bit of the serial data character has shifted into B0 flip-flop 88, the contents of the shift register section 16 are gated out of the register in parallel via output gating section 18. This is accomplished by a logic "1" level on the gate data (GD) input to character framing circuit 10 which is coupled in common to an input of each of the AND gates which make up output gating section 18. This logic "1" level enables each of the AND gates of output gating circuit 18 such that the logic state present at the Q output of each register flip-flop is reproduced as a logic state present on the corresponding data output. Thus, for example, a logic "1" at the Q output of B6 flip-flop 76 would be coupled via conductor 107 to an input of AND gate 92 resulting in a logic "1" at the output of AND gate 92 which couples to the D6 output of character framing circuit 10 via conductor 136. AND gates 94, 96, 98, 100, 102 and 104 function in a similar manner such that the logic states present in the register flip-flops are gated to form the parallel data output of character framing circuit 10.

Turning now to FIG. 2, the operation of character framing circuit 10 is summarized by a sequence of diagrams illustrating the repetitive series of steps involved in loading a sequence of serial data characters. The diagrams of FIG. 2 assume that each serial data character consists of seven bits which have been designated by a letter such that A represents the first data bit, B represents the second data bit and so forth. The first register diagram of FIG. 2 shows a complete serial data character loaded into the stages of register section 16 (FIG. 1) such that the first bit of the received data character is located in register stage B0, the second bit of the received character is located in register stage B1, and so on. The diagram of FIG. 2 shows the bits of the next serial data character which will be received at location 202. The arrows as at location 203 through 209 indicate the parallel gating paths provided by output gating circit 18 (FIG. 1) by which a serial data character is gated out of character framing circuit 10 when reception is complete. Thus, as noted in the drawing, the first register diagram of FIG. 2 assumes that the (N−1)th serial data word has been loaded and that this word is ready for parallel gating out of the register while the Nth serial data word is ready to be shifted into the register for subsequent cycles of the clock.

For the first clock cycle of word N, the first bit of the serial data word has been shifted into register flip-flop B6 while the remaining register flip-flops have been set to a particular control code prefix consisting of a logic "0" state directly preceding the first bit of the serial data word and logic "1" in all other register flip-flops. For successive cycles of the clock this prefix of logic "1"'s and a logic "0" shifts through the successive stages of register section 16 (FIG. 1) as indicated by the sequence of register diagrams in FIG. 2. In the seventh clock cycle the logic "0" of the prefix has moved to the "shift register full" position (SRF flip-flop 90 in FIG. 1). This state of the shift register full flip-flop indicates that a complete data character has been loaded and is ready for parallel gating out of the register and triggers control logic 12 (FIG. 1) to reestablish the correct prefix in the register flip-flops to implement the correct loading of the (N+1)th serial data word.

The details of control logic operation are explained by considering control logic section 12 shown in FIG. 1. For normal operation, initialize on frame detect (IFD) input 34 and the RESET input 52 are at a logic "0" level and the character frame defined (CFD) input 22 is at a logical "1" level. When a serial data character has been completely loaded, the logic "0" of the prefix will enter SRF flip-flop 90 as has been previously discussed, resulting in a logic "0" level on conductor 28.

This logic "0" together with the logic "0" level on conductor 26 resulting from the logic "1" applied at the input of inverter 20 by the CFD input results in a logic "1" on conductor 32 which is in turn coupled by OR gate 30 to produce a logic "1" on conductor 38 which couples to the D input of I flip-flop 36. These logical actions take place immediately after the negative clock transition present on $\overline{CRX}$ input 40 which couples to the clock input of SRF flip-flop 90. On the next subsequent positive transition of a clock on $\overline{CRX}$ input 40, the action of inverter 42 results in a negative clock transition on conductor 44 which couples to the clock input of I flip-flop 36. This clock transition clocks the logic "1" level present on conductor 38 into I flip-flop 36 resulting in logic "1" at its Q output which couples to conductor 48. This logic "1" on conductor 48 results in logic "1" on the INITIALIZE output of character framing circuit 10 which provides a signal to external circuitry indicating that a serial data character is fully loaded and ready for parallel gating out as has been previously discussed.

The logic "1" on conductor 48 results in logic "0" at the output of NOR gate 62 which couples to the input of B5 flip-flop 78 via conductor 120. Similarly, the logic "1" on conductor 48 results in logic "1" at the output of OR gates 64, 66, 68, 70, 72 and 74 which in turn are coupled to the D inputs of the remaining register flip-flops. Thus, a particular control code prefix, as previously described, will be gated into the appropriate register flip-flops with the next negative clock transition present on $\overline{CRX}$ input 40. The logic "1" on conductor 48 also couples to the data input of IR flip-flop 46. The negative clock transition on clock input $\overline{CRX}$ 40 will thus set IR flip-flop 46 resulting in logic "0" at its $\overline{Q}$ output which couples to an input of NAND gate 54 via conductor 58. The resulting logic "1" on conductor 60 is coupled to the reset input of I flip-flop 36 such that I flip-flop 36 is reset and the control logic circuitry is once again ready to detect the completion of loading of the next serial data character. Control logic section 12 is thus seen to operate cyclically to implement the serial loading of a sequence of data characters such as is encountered in synchronous serial data transmission.

An additional mode of operation of control logic section 12 is provided through the action of RESET conductor 52. As indicated in assignee's aforementioned U.S. Pat. No. 4,071,887, the RESET function provides external control which can be imposed during any portion of the operation cycle of a synchronous serial data adaptor to prevent erroneous output transmission. For the particular case of the character framing circuit of the present invention, this control is established when the RESET conductor 52 changes from a logic "0" (inactive) state to a logic "1" state. As shown in FIG. 1, the logic "1" on conductor 52 is coupled to the set input of each of the register flip-flops of register section 16 causing the Q outputs of each of these flip-flops to assume the logic "1" state. The logic "1" on conductor 52 is inverted by inverter 50 to produce a logic "0" on conductor 56 which couples to an input of NAND gate 54. The resultant logic "1" on the output of NAND gate 54 couples to the reset input of I flip-flop 36 and forces the I flip-flop 36 into its reset state. As previously discussed, normal operation of character framing circuit 10 depends on the insertion of a logic "0" in the B5 register flip-flop 78 and the subsequent shifting of this logic "0" through successive register stages until the presence of a logic "0" in SRF flip-flop 90 initiates operation of control logic section 12 to produce an output on INITIALIZE conductor 48. Since the application of a RESET signal prevents the insertion of the required logic "0", character framing circuit 10 will remain inactive through on-going transitions of the $\overline{\text{CRX}}$ clock cycles until normal operation is assumed by the appearance of a logic "1" on IFD (Initialize Frame Detect) conductor 34.

The foregoing description of the present invention has been in terms of a particular logic embodiment adapted for receiving serial data characters having a fixed length of seven bits. As will be obvious to persons skilled in the art, character framing according to the present invention is readily adaptable to other serial synchronous data systems utilizing data characters of other lengths. Further, the invention is applicable to data systems adapted for serial data characters of variable lengths where the particular logic structure chosen can be altered under program control to adapt to the requirements of varying lengths serial data characters while still obtaining the reduced circuit complexity and attendant cost advantages of the present invention.

What is claimed is:

1. A digital system for receiving successive data characters transmitted as contiguous characters forming synchronous serial data which is a continuous sequence of digital data bits, said system comprising:
   (a) shift register means comprising a plurality of serially coupled shift register stages each, except for the last stage thereof, having an output connected to the input of the succeeding stage, and the first stage thereof being coupled to a source of said serial data, and each stage being coupled to a source of clock pulses, said clock pulses being synchronized with said digital data bits;
   (b) logic means for generating a control code prefix and for loading said control code prefix into one of said shift register stages;
   (c) means for shifting said control code prefix to a second one of said shift register stages and for coincidentially shifting serial data into said shift register means in synchronism with said source of clock pulses;
   (d) means for detecting said control code prefix in said second shift register stage and for generating a signal;
   (e) means responsive only to said signal for indicating that said serial data is occupying said shift register means as a received serial data character; and
   (f) control means coupled to said logic means and to said source of clock pulses and responsive to the occurrence of said signal for causing said logic means to generate and load said control code prefix.

2. A digital system as recited in claim 1 wherein said received serial data character comprises a first bit and said control code prefix comprises a second bit at a fixed logic level in said shift register immediately preceding in time sequence said first bit.

3. A digital system as recited in claim 2 wherein said control code prefix further comprises at least one additional bit at a different fixed logic level adjacent to and preceding in time sequence said second bit.

4. A digital system as recited in claim 1 wherein said means for detecting comprises a first flip-flop for detecting when said serial data character is fully loaded in said shift register means.

5. A digital system as recited in claim 4 wherein said means for detecting further comprises a second flip-flop responsive to said first flip-flop for generating a reset signal for resetting said first flip-flop after said detection has occurred.

* * * * *